United States Patent
Chen et al.

(10) Patent No.: US 8,914,523 B2
(45) Date of Patent: Dec. 16, 2014

(54) DYNAMIC INTERNET PROTOCOL REGISTRY FOR MOBILE INTERNET PROTOCOL BASED COMMUNICATIONS

(75) Inventors: Xuming Chen, San Ramon, CA (US); Mingxing Li, San Jose, CA (US); Imtiyaz Shaikh, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 679 days.

(21) Appl. No.: 12/781,533

(22) Filed: May 17, 2010

(65) Prior Publication Data

US 2011/0282931 A1 Nov. 17, 2011

(51) Int. Cl.
*G06F 15/16* (2006.01)
*H04L 29/12* (2006.01)

(52) U.S. Cl.
CPC ........ *H04L 61/3075* (2013.01); *H04L 61/6054* (2013.01); *H04L 29/12735* (2013.01); *H04L 29/12905* (2013.01); *H04L 61/157* (2013.01); *H04L 61/605* (2013.01); *H04L 29/12896* (2013.01); *H04L 29/1216* (2013.01)
USPC ............................ 709/228; 709/223; 709/229

(58) Field of Classification Search
CPC ....... H04L 47/28; H04L 47/286; H04L 61/20; H04L 6/20531
USPC ......... 709/203, 223, 245, 249, 228, 229, 230; 370/352–389; 455/461, 432.1, 432.2, 455/433, 436
See application file for complete search history.

(56) References Cited

U.S. PATENT DOCUMENTS

| | | | |
|---|---|---|---|
| 6,195,689 B1 * | 2/2001 | Bahlmann | 709/217 |
| 6,578,074 B1 * | 6/2003 | Bahlmann | 709/220 |
| 6,799,204 B1 * | 9/2004 | Baba et al. | 709/220 |
| 6,917,976 B1 * | 7/2005 | Slaughter et al. | 709/226 |
| 6,952,428 B1 * | 10/2005 | Necka et al. | 370/466 |
| 7,010,303 B2 * | 3/2006 | Lewis et al. | 455/445 |
| 7,027,582 B2 * | 4/2006 | Khello et al. | 379/220.01 |
| 7,099,338 B1 * | 8/2006 | Lee | 370/401 |
| 7,159,016 B2 * | 1/2007 | Baker | 709/220 |
| 7,558,845 B2 * | 7/2009 | Finley et al. | 709/220 |
| 7,568,040 B2 * | 7/2009 | Townsley et al. | 709/230 |
| 7,571,308 B1 * | 8/2009 | Bahl et al. | 713/151 |
| 7,577,146 B2 * | 8/2009 | Arberg et al. | 370/392 |
| 7,797,568 B2 * | 9/2010 | Kubota | 714/4.11 |

(Continued)

OTHER PUBLICATIONS

Turanyi et al.; Global Internet Roaming with ROAMIP; Mobile Computing and Communications Review, vol. 4, No. 3; Jul. 2000; pp. 58-68.*

*Primary Examiner* — Jimmy H Tran (57) ABSTRACT

A server device configured to store an Internet protocol (IP) registry, the registry includes information for a user device, the information includes particular identifiers for the user device, an IP address for the user device, and a particular access point name (APN), where the particular APN corresponds to a service, an application, a network, or data used by the user device; receive a query that includes identifiers and an APN; perform, using the IP registry, an operation to identify the information, for the user device, based on the identifiers and the APN; obtain the information for the user device, when the identifiers match the particular identifiers stored in the IP registry and when the APN matches the particular APN stored in the IP registry; and send, to an application server, the information for the user device, where the IP address permits the application server to communicate with the user device.

25 Claims, 7 Drawing Sheets

(56) References Cited

U.S. PATENT DOCUMENTS

| | | | |
|---|---|---|---|
| 8,125,993 B2* | 2/2012 | Arberg et al. | 370/392 |
| 8,351,928 B2* | 1/2013 | Sastry et al. | 455/432.1 |
| 2002/0138614 A1* | 9/2002 | Hall | 709/225 |
| 2003/0007482 A1* | 1/2003 | Khello et al. | 370/352 |
| 2003/0115298 A1* | 6/2003 | Baker | 709/220 |
| 2003/0195954 A1* | 10/2003 | Bahlmann | 709/222 |
| 2003/0208602 A1* | 11/2003 | Bhalla et al. | 709/227 |
| 2004/0202466 A1* | 10/2004 | Koch et al. | 398/1 |
| 2005/0105529 A1* | 5/2005 | Arberg et al. | 370/395.5 |
| 2005/0114492 A1* | 5/2005 | Arberg et al. | 709/223 |
| 2005/0282531 A1* | 12/2005 | Andreasson | 455/418 |
| 2006/0133319 A1* | 6/2006 | Kant | 370/331 |
| 2007/0203990 A1* | 8/2007 | Townsley et al. | 709/206 |
| 2008/0065747 A1* | 3/2008 | Kubota | 709/220 |
| 2008/0076420 A1* | 3/2008 | Khetawat et al. | 455/435.1 |
| 2008/0281973 A1* | 11/2008 | Yang | 709/228 |
| 2009/0052415 A1* | 2/2009 | Ishii et al. | 370/338 |
| 2009/0257425 A1* | 10/2009 | Sastry et al. | 370/350 |
| 2009/0307338 A1* | 12/2009 | Arberg et al. | 709/221 |
| 2010/0165928 A1* | 7/2010 | Chen et al. | 370/329 |
| 2010/0211628 A1* | 8/2010 | Shah | 709/203 |

\* cited by examiner

DYNAMIC INTERNET PROTOCOL REGISTRY FOR MOBILE INTERNET PROTOCOL BASED COMMUNICATIONS

BACKGROUND

Today's user devices are capable of performing an ever-increasing variety of functions and tasks that continue to improve the user's experience. User devices are dynamically assigned temporary Internet protocol (IP) addresses that permit the user devices to receive a variety of services, connect to wired and wireless networks, and handle an array of data and communications, such as voice, video, text, etc.

The temporary IP address, that is assigned to a user device, can be periodically updated based on time-to-release (TTR) information associated with the temporary IP address, which specifies the amount of time that the IP address is to remain valid. It is not always easy, however, for network devices to locate and/or communicate with user devices because the IP addresses are constantly changing.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

An implementation described herein may include systems and/or methods that provide for a dynamic Internet protocol (IP) registry for mobile IP-based communications implementation (hereinafter referred to as a "dynamic IP registry") using a technique that enables a server device to obtain IP address information that has been dynamically assigned to a user device and to use the IP address information to communicate with the user device using an IP protocol. Additionally, or alternatively, the dynamic IP registry may permit a server device to push an array of services (e.g., new applications, software updates, messaging services, etc.) and/or to exchange an array of communications (e.g., text, voice, video, etc.) with a user device, using IP-based communication protocols, that are not supported by short messaging protocols, such as short message service (SMS) protocol. Furthermore, using IP protocols to communicate with the user device may avoid potential processing delays associated with SMS messaging and/or may reduce reliance on SMS network resources. Additionally, or alternatively, IP-based communication protocols may prove beneficial when communicating with a user device that does not support SMS protocols, such as long term evolution (LTE)-based user devices and/or when services, not supported by SMS protocols, are desired, such as LTE-based services.

As described herein, user device information may be generated and sent to a dynamic IP registry. For example, a gateway server may be connected to a user device and may communicate with the user device in accordance with a particular plan (e.g., a service provider plan) and may obtain user device identification information that may include public identifier information and/or private identifier information. The gateway server may assign a temporary IP address to the user device, where the temporary IP address may expire at a point in time that is governed by TTR information with which the IP address is associated. Additionally, or alternatively, the gateway server may obtain information associated with an access point name and/or may obtain port information via which the gateway server may communicate with the user device. Access point name (APN) information may correspond to a service, a network, an application, and/or data (e.g., text, voice, video, etc.) used by the user device. The gateway server may send, as user device information, the user device identification information, the assigned IP address, the TTR information associated with the assigned IP address, the APN information, and/or the port information to an IP registry server. The IP registry server may receive the user device information and may store the user device information in a dynamic IP registry.

As further described herein, an IP address query operation may be performed. For example, an application server may desire to communicate with a particular user device (e.g., to push services, such as software updates and/or other services to the user device, and/or to push information to the user device) and may communicate with the IP registry server to obtain IP address information via which the application server may communicate with the user device. The dynamic IP registry server may perform a lookup operation based on the communication with the application server to obtain the IP address information associated with the user device. The dynamic IP registry may send the IP address information, associated with the user device, to the application server.

As further described herein, an operation to extend the period of time over which the IP address remains valid may be performed. For example, the application server may receive the IP address information and may determine, from the TTR information associated with the IP address, that the period of time, over which the IP address remains valid, is less than a particular period of time during which the application server desires to push services, an application, data (e.g., text, voice, video, etc.), and/or other information to the user device. The application server may send a request to the IP registry server to extend the TTR, associated with the IP address, so that the IP address expires at a later point in time. The IP registry server may receive the request and may communicate with the gateway server to obtain TTR extension information associated with the IP address. The IP registry server may receive the TTR extension information and may forward the TTR extension information to the application server.

As yet further described herein, an application server may communicate with a user device using IP-based communication protocols. For example, the application server may receive the IP address information and/or the TTR extension information and use the IP address information and/or the TTR extension information to communicate with the user device via the gateway server. Additionally, or alternatively, the application server may push services, an application, data (e.g., text, voice, video, etc.), and/or other information, via the gateway server and using IP-based communication protocols, to the user device.

Figure 1:
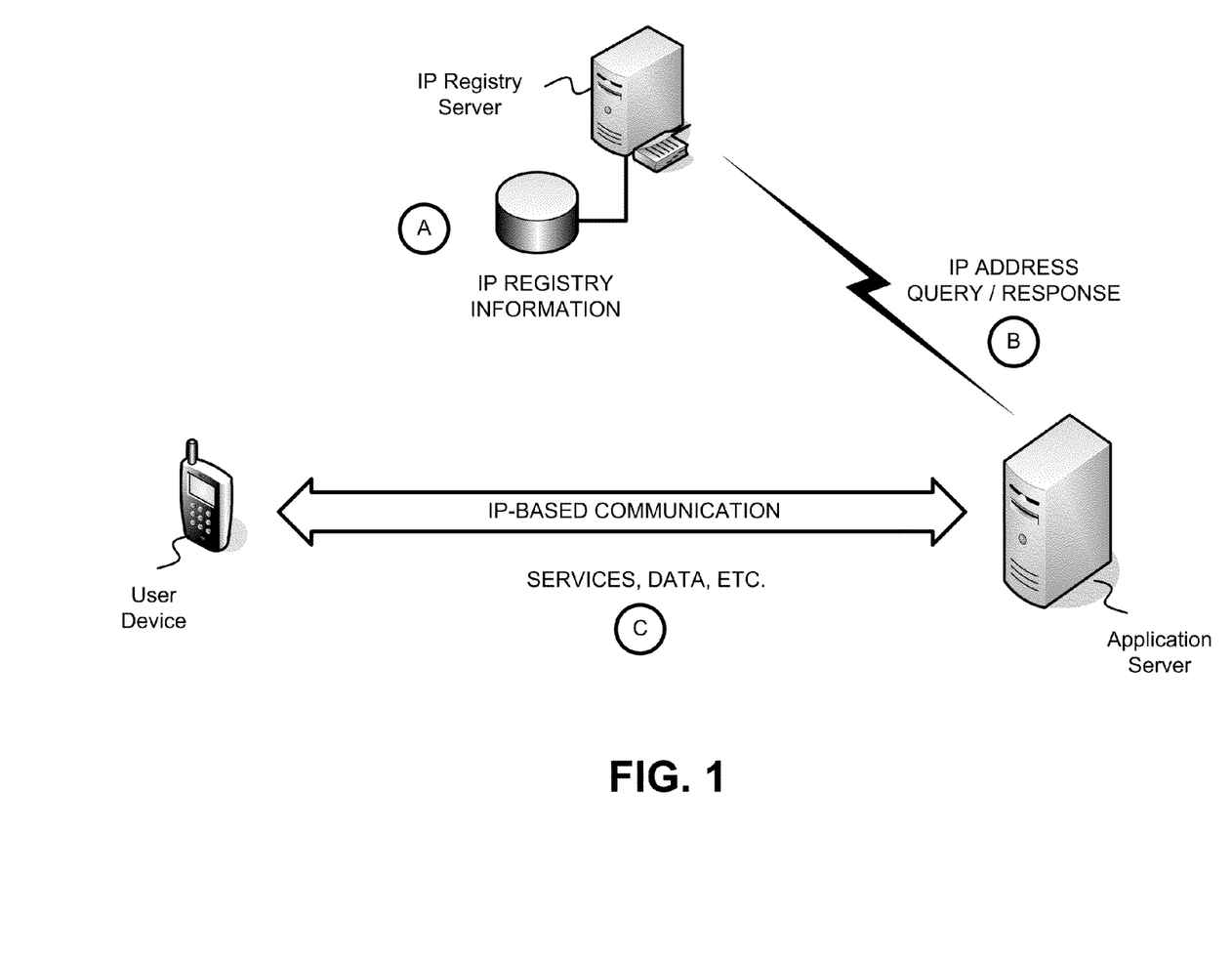
FIG. 1 is a diagram that illustrates an overview of a dynamic Internet protocol (IP) registry implementation described herein.

FIG. 1 is a diagram that illustrates an overview of a dynamic IP registry implementation described herein. As illustrated in FIG. 1, a network may include an application server, an IP registry server and a user device. The application server may store software and/or data that permits the application server to provide services, such as software updates, applications, messaging services, data, and/or information, to the user device. The IP registry server may store user device identification, associated with the user device, in a dynamic IP registry stored in a memory. The IP registry server may communicate with the application server to perform IP address query operations to obtain an IP address, associated with the user device, that enables the application server to provide services to the user device using IP-based communication protocols.

Information associated with the user device may be stored in an IP registry. For example, as shown in FIG. 1 (e.g., as indication A) the IP registry server may store, in a dynamic IP registry, user device information for each user device in a group of user devices. The user device information for a particular user device may include user device identification information that contains a public identifier (e.g., a mobile subscriber integrated services digital network number (MSISDN)) and/or a private identifier (e.g., an international mobile subscriber identity (IMSI)); IP address information assigned to the particular user device; TTR information that indicates the point in time when the IP address expires; APN information, corresponding to a service, a network, an application, and/or data (e.g., text, voice, video, etc.), that is used by the particular user device; and/or a port number (e.g., port 1, port 2, port 3, etc.) via which the particular user device may communicate to receive the service, the network, the application, and/or the data associated with each APN.

The application server may send an IP address query to the IP registry server to obtain information associated with the particular user device (e.g., as shown by indication B). For example, the application server may send a query to the IP registry server that may include a public identifier (e.g., MSISDN) and/or a private identifier (e.g., IMSI, NAI, etc.) associated with the particular user device. Additionally, or alternatively, the query may include APN information corresponding to a service, a network, an application, and/or data (e.g., text, voice, video, etc.) about which the application desires to communicate with the particular user device. The IP registry server may receive the query and may obtain user device information, associated with the particular user device, based on the public and/or private identifier information. From the user device information obtained from the dynamic IP registry, the IP registry server may use the APN information received from the application server to obtain a particular IP address, a port, and/or a particular TTR that corresponds to the particular APN. The IP registry server may send, to the application server, the particular IP address, the port, and/or the TTR in response the IP address query received from the application server.

The application server may communicate with the user device using IP-based communication protocols (e.g., as shown by indication C). For example, the application server may receive the response to the query from the IP registry server and may use the IP address and/or the port information to communicate with the user device. In this example, the application server may push services, data, software updates, applications, etc. to the user device using IP-based communication protocols, such as transmission control protocol/Internet protocol (TCP/IP), IP version 4 (IPv4), IP version 6 (IPv6), etc.

Figure 2:
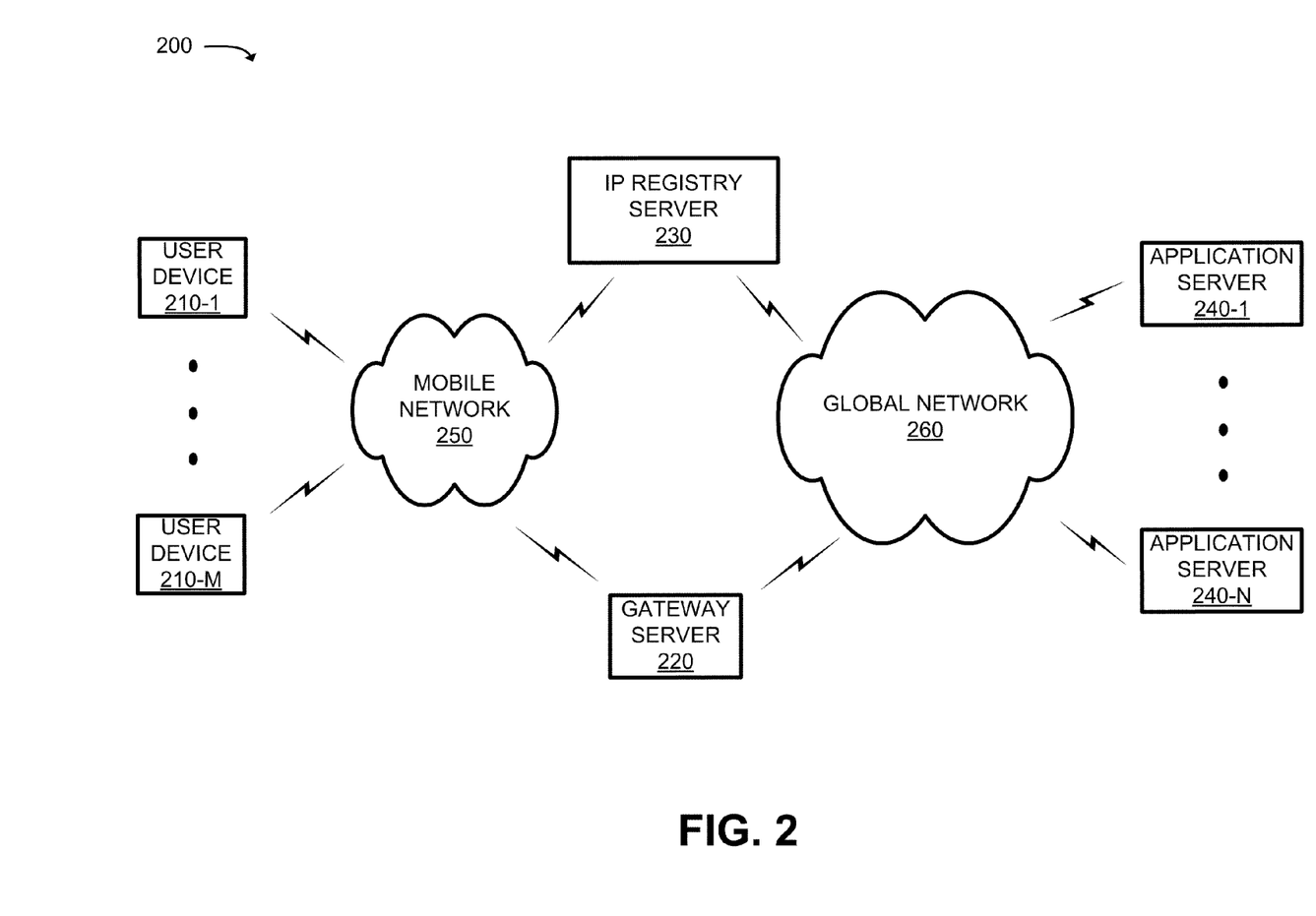
FIG. 2 is a diagram of an exemplary network in which systems and/or methods described herein may be implemented.

FIG. 2 is a diagram of an exemplary network 200 in which systems and/or methods described herein may be implemented. As shown in FIG. 2, network 200 may include user devices 210-1, ..., 210-M (where M≥1) (hereinafter referred to collectively as "user devices 210" and individually as "user device 210"), gateway server 220, IP registry server 230, application servers 240-1, ..., 240-N (where N≥1) (hereinafter referred to collectively as "application servers 240" and individually as "application server 240"), mobile network 250 and global network 260. A group of user devices 210, a gateway server 220, an IP registry server 230, a group of application servers 240, a mobile network 250 and a global network 260 are illustrated in FIG. 2 for simplicity. In practice, there may be additional, fewer, different or differently arranged user devices 210, gateway servers 220, IP registry servers 230, application servers 240, mobile networks 250 and/or IP networks 270.

Also, in some implementations, one or more of the devices of network 200 may perform one or more functions described as being performed by another one or more of the devices of network 200. For example, gateway server 220, IP registry server 230, and/or application server 240 may be integrated into a single device. Components of network 200 may interconnect via wired connections, wireless connections, or a combination of wired and wireless connections.

User device 210 may include any computation or communication device, such as a wireless mobile communication device that is capable of communicating with gateway server 220, IP registry server 230, and/or application servers 240. For example, user device 210 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop computer, a personal computer, a STB, a television, a camera, a personal gaming system, or another type of computation or communication device.

User device 210 may be associated with unique user device identification information that enables gateway server 220 and/or other network devices to distinguish user device 210 from other user devices 210. The user device identification information may include a private identifier (e.g., IMSI and/or NAI) and/or a public identifier (e.g., MSISDN). User device 210 may communicate with gateway server 220 via short messaging protocols (e.g., SMS), IP protocols (TCP/IP, IPv4, IPv6, etc.) and/or other protocols. User device 210 may communicate with application server 240 and/or other network devices, via gateway server 220, to receive services, to access networks, to use applications, and/or to exchange data or information. The services, applications, networks, data, etc. may each be associated with particular APN information, to which corresponding IP addresses and/or ports may be assigned.

The description to follow will generally refer to user device 210 as a wireless mobile communication device. The description is not limited, however, to a wireless mobile communication device and may equally apply to other types of user devices.

Gateway server 220 may include one or more server devices, or other types of computation or communication devices, that gather, process, search, store, and/or provide information in a manner similar to that described herein. For example, in one implementation, gateway server 220 may include a server device that enables and/or facilitates communications, using IP-based communication protocols, between user device 210 and other networks (e.g., global network 260) and/or other network devices (e.g., application server 240). Gateway server 220 may interface with user device 210, IP registry server 230, and/or application servers 240. Gateway server 220 may facilitate communications for user device 210, by performing network address translation (NAT) operations associated with communications between user device 210 and other network devices. NAT operations generally include dynamically assigning an IP address, associated with gateway server 220, to user devices 210 that permit user devices 210 to communicate with network devices via one or more ports associated with gateway server 220.

Gateway server 220 may generate user device information for a dynamic IP registry. For example, gateway server 220 may identify user device 210 using the unique user device identification information and may assign an IP address to user device 210 that may permit user device 210 to communicate with network devices (e.g., application servers 240) via mobile network 250 and/or global network 260. In this example, gateway server 220 may assign the IP address that corresponds to particular APN information, corresponding to a service, a network, an application, and/or data (e.g., text, voice, video, etc.), with which user device 210 desires to communicate. Gateway server 220 may obtain information associated with a period of time that the IP address is to remain valid and/or a future point in time when the IP address is to expire (e.g., TTR information). Additionally, or alternatively, gateway server 220 may obtain information associated with a particular port, used by user device 210, that corresponds with the particular APN information, via which services, networks, applications and/or data are to be accessed and/or retrieved by user device 210. In another example, gateway server 220 may assign other IP addresses and/or corresponding TTR information, to user device 210, for each APN information associated with user device 210. Gateway server 220 may store (e.g., in a memory associated with gateway server 220), as user device information, the IP address, the TTR information, the APN information and/or the port information corresponding to user device 210 (e.g., identified by the unique user device identification information) and may send the user device information to IP registry server 230.

Gateway server 220 may facilitate communications with user device 210. For example, gateway server 220 may receive a communication (e.g., an IP-based communication) associated with a particular service, application, network, and/or data (e.g., text, voice, video, etc.), destined for user device 210, from application server 240. The communication may include user device identification information, an IP address, a TTR associated with the IP address, APN information, and/or port information. Gateway server 220 may send the communication to user device 210, based on the port information and/or the user device identification information.

IP registry server 230 may include one or more server devices, or other types of computation or communication devices, that gather, process, search, store, and/or provide information in a manner similar to that described herein. For example, IP registry server 230 may include a server device that communicates with network devices to obtain user device information (e.g., IP addresses, user device identification information, information associated with gateway servers, APN information, etc.), to use the obtained user device information to maintain a dynamic IP registry, and/or to provide a dynamic IP registry service for the network devices. In one implementation, IP registry server 230 may be a home subscriber service (HSS) and/or authorization, authentication, and accounting (AAA) server device (hereinafter referred to as an "HSS/AAA server device") that maintains a dynamic IP registry and/or provides AAA services to other network devices. IP registry server 230 may interface with user device 210, gateway server 220, and/or application servers 240 and may provide information to application server 240 that enables application servers 240 to communicate with user device 210 using IP-based communication protocols.

IP registry server 230 may maintain a dynamic IP registry. For example, IP registry server 230 may receive user device information associated with user device 210 and/or other user devices 210 from gateway server 220 and may store the user device information in a dynamic IP registry, which is stored in a memory associated with IP registry server 230. IP registry server 230 may, at a later point in time, receive user device information associated with user device 210 that may include another IP address and/or corresponding TTR when the IP address, previously assigned and/or stored in the dynamic IP registry, expires. IP registry server 230 may replace the user device information, stored in the memory, with the user device information received at the later point in time from gateway server 220. In one implementation, IP registry server 230 may act as an HSS/AAA server device in an LTE and/or 4G network and may communicate with gateway server 220 using an LTE and/or 4G mobility protocol (e.g., via a Sb6 interface) to receive user device information and/or to extend a TTR corresponding to a particular IP address.

IP registry server 230 may perform an IP address query operation. For example, IP registry server 230 may receive an IP address query, associated with user device 210, from application server 240. The query may include user device identification information (e.g., a public identifier, a private identifier, etc.) and/or APN information corresponding to a service, a network, an application, and/or data (e.g., text, voice, video, etc.). IP registry server 230 may retrieve, from the dynamic IP registry stored in the memory, user device information associated with the user device identification information received in the IP address query. From the user device information, IP registry server 230 may obtain the IP address, associated TTR, and/or port information corresponding to the APN information associated with application server 240. IP registry server 230 may send information associated with the IP address, TTR, port, and/or APN to application server 240 in response to the IP address query received from application server 240. In one implementation, IP registry server 230 may act as an HSS/AAA server device in an LTE and/or 4G network and may communicate with application server 240 using a session initiation protocol (SIP), an AAA protocol, and/or some other protocol (e.g., via a Sh interface) to permit application server 240 to initiate communications, authenticate to the HSS/AAA service device, and/or to dynamically discover an IP address associated with user device 210.

Application server 240 may include one or more server devices, or other types of computation or communication devices, that gather, process, search, store, and/or provide information in a manner similar to that described herein. For example, application server 240 may include a server device that hosts a website that can be accessed by user device 210, that stores data, software, and/or applications to be used by user device 210, and/or that provides services (e.g., messaging services, software updates, etc.) to user device 210. Application server 240 may interface with user device 210, gateway server 220, and/or IP registry server 230 and may communicate, using IP-based protocols, with user device 210 based on an IP address query response received from IP registry server 230.

Application server 240 may send an IP address query to IP registry server 230. For example, application server 240 may desire to communicate with user device 210 regarding a particular service, an application, a network, and/or data (e.g., text, voice, video, etc.) and may generate an IP address query to obtain an IP address and/or other information associated with user device 210. Application server 240 may obtain user device identification information associated with user device 210 (e.g., a public identifier, a private identifier, etc.) and particular APN information, corresponding to a service, a network, an application, and/or data (e.g., text, voice, video, etc.), about which application server 240 desires to communicate with user device 210. Application server 240 may send the IP address query, associated with user device 210, that includes the public identifier, the private identifier, APN information, etc., to IP registry server 230 and may receive an IP address query response that includes an IP address, TTR information associated with the IP address that indicates when the IP address expires, and/or port information that corresponds to the APN information. Application server 240 may use the information obtained from the IP address query response to communicate with user device 210 via gateway server 220.

Mobile network 250 may include a mobile telephone network, such as a cellular network, the Public Land Mobile Network (PLMN), and/or a 2G, a 3G, and/or a 4G network. Additionally, or alternatively, network 250 may include a broadband network, a service provider network and/or a carrier network.

Global network 260 may include a global network, such as a wide area network (WAN), a metropolitan area network (MAN), a telephone network (e.g., the Public Switched Telephone Network (PSTN), or a cellular network, such as the PLMN, and/or a 2G, a 3G, and/or a 4G network), an ad hoc network, an intranet, the Internet, a fiber optic-based network (e.g., a fiber optic service (FiOS) network), or a combination of networks. Additionally, or alternatively, global network 260 may include a broadband network, a service provider network and/or a carrier network.

Although not shown in FIG. 2, network 200 may include a variety of other devices, such as an authentication server, a self-provisioning server, etc. Each of these devices may perform certain functions described briefly below. Any of these functions may be performed by gateway server 220, IP registry server 230 and/or application server 240. Thus, one or more of these devices may be integrated into gateway server 220, IP registry server 230, and/or application server 240.

The authentication server may include one or more server devices, or other types of computation or communication devices, that authenticates user device 210. For example, the authentication server may receive a request to authenticate user device 210 based on information associated with gateway server 220 (e.g., an identifier associated with gateway server 220), information associated with a user of user device 210 (e.g., username, password, email address, PIN, etc.), and/or information associated with user device 210 (e.g., an identifier associated with user device 210).

The self-provisioning server may include one or more server devices, or other types of computation or communication devices that enable the registration of user device 210. The self-provisioning server may receive registration information from user device 210 and/or gateway server 220. The self-provisioning server may facilitate sending address information, associated with gateway server 220 and/or application server 240, to user device 210 and/or may forward user device identification information, associated with user device 210, to gateway server 220, IP registry server 230 and/or application server 240.

Figure 3:
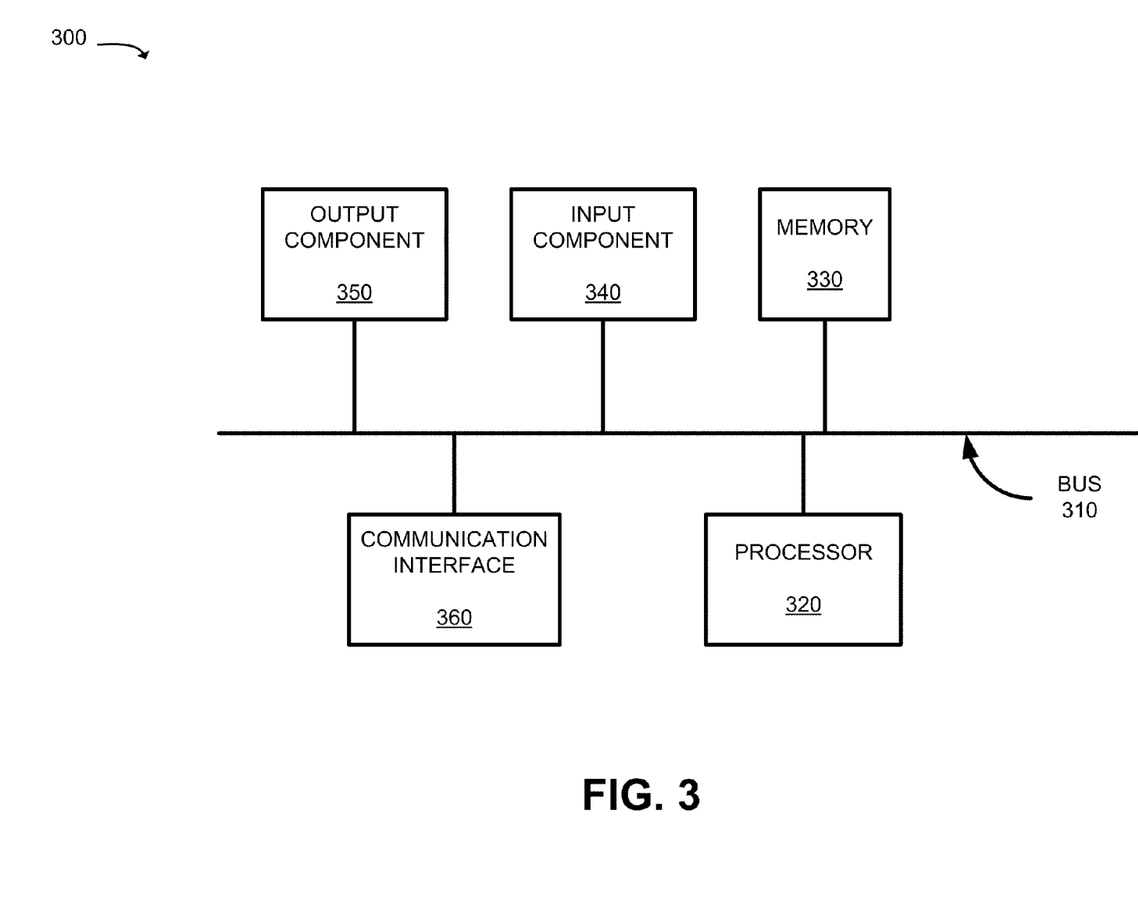
FIG. 3 is a diagram of exemplary components of one or more of the devices of FIG. 2.

FIG. 3 is a diagram of exemplary components of a device 300 that may be associated with gateway server 220, IP registry server 230, and/or application server 240. Device 300 may include a bus 310, a processor 320, a memory 330, an input component 340, an output component 350, and a communication interface 360. Although FIG. 3 shows exemplary components of device 300, in other implementations, device 300 may contain fewer components, additional components, different components, or differently arranged components than depicted in FIG. 3. Additionally, or alternatively, in other implementations, one or more components of device 300 may perform one or more tasks described as being performed by one or more other components of device 300.

Bus 310 may include a path that permits communication among the components of device 300. Processor 320 may include a processor, microprocessor, or processing logic that may interpret and execute instructions. Memory 330 may include any type of dynamic storage device that may store information and instructions for execution by processor 320, and/or any type of non-volatile storage device that may store information for use by processor 320.

Input component 340 may include a mechanism that permits a user to input information to device 300, such as a keyboard, a keypad, a button, a switch, etc. Output component 350 may include a mechanism that outputs information to the user, such as a display, a speaker, one or more light emitting diodes (LEDs), etc. Communication interface 360 may include any transceiver-like mechanism that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.) or a combination of wireless and wired communications. For example, communication interface 360 may include mechanisms for communicating with another device or system via a network, such as mobile network 250 and/or global network 260.

As will be described in detail below, device 300 may perform certain operations relating to a dynamic IP registry. Device 300 may perform these operations in response to processor 320 executing software instructions contained in a computer-readable medium, such as memory 330. A computer-readable medium may be defined as a physical or logical memory device. A logical memory device may include memory space within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Figure 4:
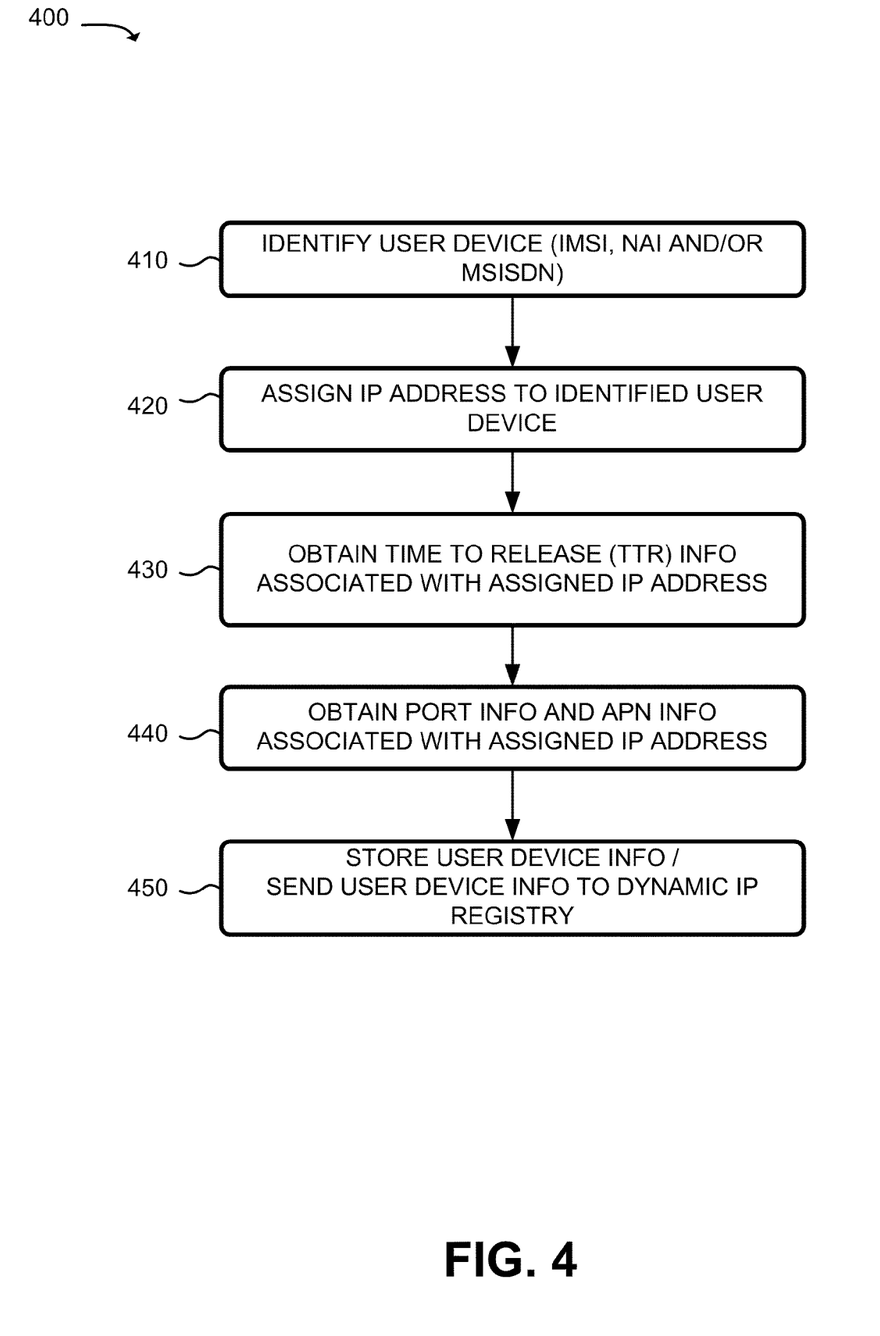
FIG. 4 is a flowchart of an exemplary process for obtaining user device information for a dynamic IP registry within an exemplary portion of the network of FIG. 2.
Figure 5:
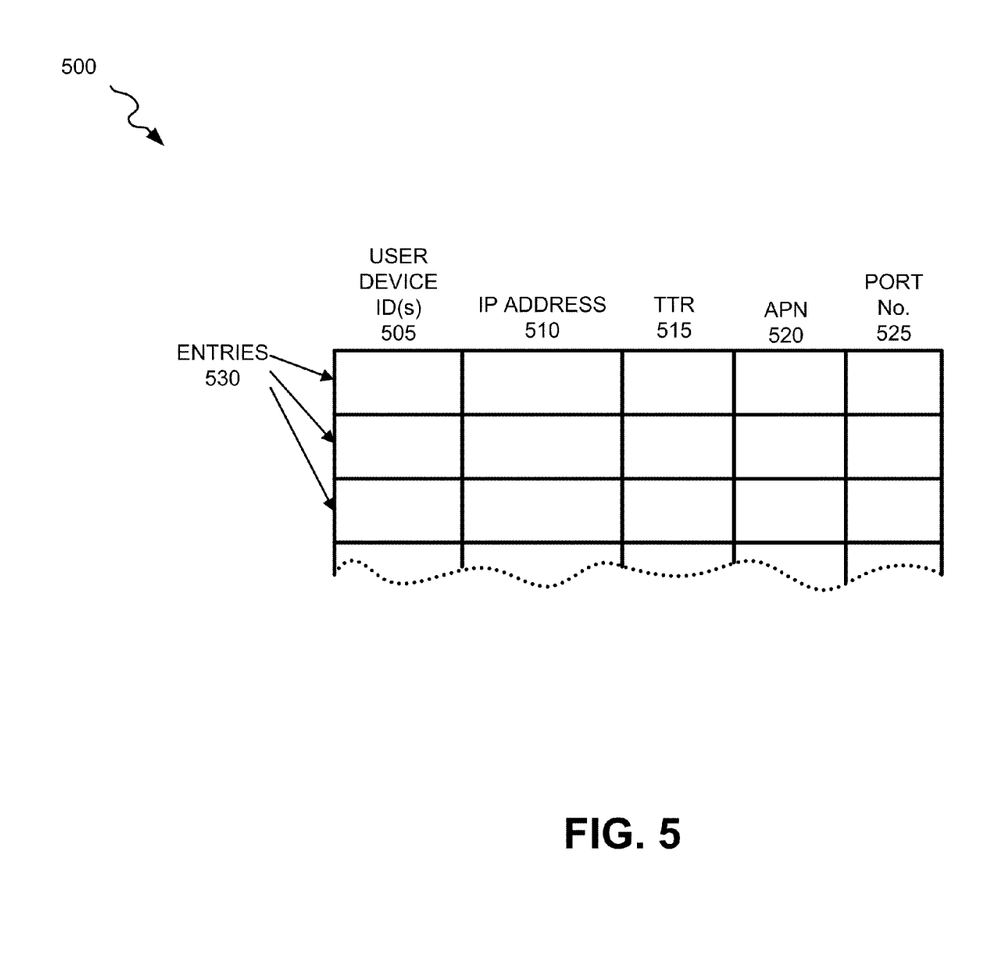
FIG. 5 is a diagram of an exemplary user device information table that is capable of being presented on the user device of FIG. 2.

FIG. 4 is a flowchart of an exemplary process for obtaining user device information for a dynamic IP registry within an exemplary portion of network 200 with respect to FIG. 2. In one implementation, process 400 may be performed by gateway server 220. In another implementation, some or all of process 400 may be performed by a device or collection of devices separate from, or in combination with, gateway server 220. FIG. 5 is a diagram of an exemplary user device information table 500 that is capable of being used by an exemplary portion of network 200 with respect to FIG. 2. A portion of process 400, of FIG. 4, will be discussed below with corresponding references to user device information table 500 shown in FIG. 5.

Process 400, of FIG. 4, may include identifying a user device (block 410). For example, gateway server 220 may retrieve, from a memory (e.g., a memory associated with gateway server 220), information associated with each user device 210 to which gateway server 220 is connected. Gateway server 220 may obtain user device identification information associated with user device 210. The user device identification information may include a public identifier associated with user device 210 (e.g., MSISDN) and/or a private identifier associated with user device 210 (e.g., IMSI, NAI, etc.).

An IP address may be assigned to the identified user device (block 420). For example, gateway server 220 may assign an IP address to user device 210. More particularly, gateway server 220 may obtain a registered IP address (e.g., registered via the Internet Assigned Numbers Authority (IRNA) and/or allocated to gateway server 220 via a regional Internet registry (RIR), local Internet registry (LIR), etc.) and may associate the registered IP address with the user device identification information associated with user device 210.

TTR information, associated with the assigned IP address, may be obtained (block 430). For example, gateway server 220 may obtain TTR information associated with the IP address. The TTR information may include a period of time during which the IP address remains valid and/or a point in time when the IP address expires. The TTR information may permit the IP address to remain valid for a particular period of time (e.g., 15 minutes, 30 minutes, 1 hour, 2 hours, etc.).

Port information and APN information associated with the assigned IP address may be obtained (block 440). For example, gateway server 220 may retrieve, from a memory (e.g., a memory associated with gateway server 220), port information (e.g., a port number) used by gateway server 220 to communicate with user device 210. Additionally, or alternatively, gateway server 220 may obtain APN information, corresponding to a service, a network, an application, and/or data (e.g., text, voice, video, etc.), used by user device 210. Gateway server 220 may associate the port information and/or the APN information with the user device identification information.

User device information may be stored and user device information may be sent to a dynamic IP registry (block 450). For example, gateway server 220 may store, as user device information, the user device identification information, the assigned IP address, the TTR information associated with the IP address, the port information, and/or the APN information, associated with user device 210, in a user device information table (e.g., user device information table 500 of FIG. 5).

As illustrated in FIG. 5, user device information table 500 may include user device identifiers (IDs) field 505, IP address field 510, TTR field 515, APN field 520, and/or port number (No.) field 525 in a number of entries 530. While FIG. 5 illustrates a user device information table, that includes certain fields, such as fields 505-525, in another implementation, a user device information table may include fewer fields, additional fields, different fields or differently arranged fields than are described with respect to FIG. 5.

For example, user device IDs field 505 may include user device identification information, such as public identifier information (e.g., MSISDN) and/or private identifier information (e.g., IMSI, NAI, etc.) associated with a particular user device 210. IP address field 510 may include an IP address assigned to the particular user device 210. TTR field 515 may include a TTR associated with the IP address for the particular user device 210. APN field 520 may include APN information corresponding to a particular service, application, network, and/or data (e.g., text, voice, video, etc.) used by the particular user device 210. Port No. field 525 may include a particular port number used by gateway server 220 to communicate with the particular user device 210.

Each entry 530 may include user device information corresponding to a particular IP address assigned to user device 210. In one implementation, multiple entries 530 may correspond to a single user device 210.

Returning to process 400, of FIG. 4, gateway server 220 may store the information associated with user device information table 500 in a memory (e.g., a memory associated with gateway server 220) and may send the information, associated with user device information table 500, to IP registry server 230. IP registry server 230 may receive the user device information and may store the user device information in a dynamic IP registry.

Figure 6:
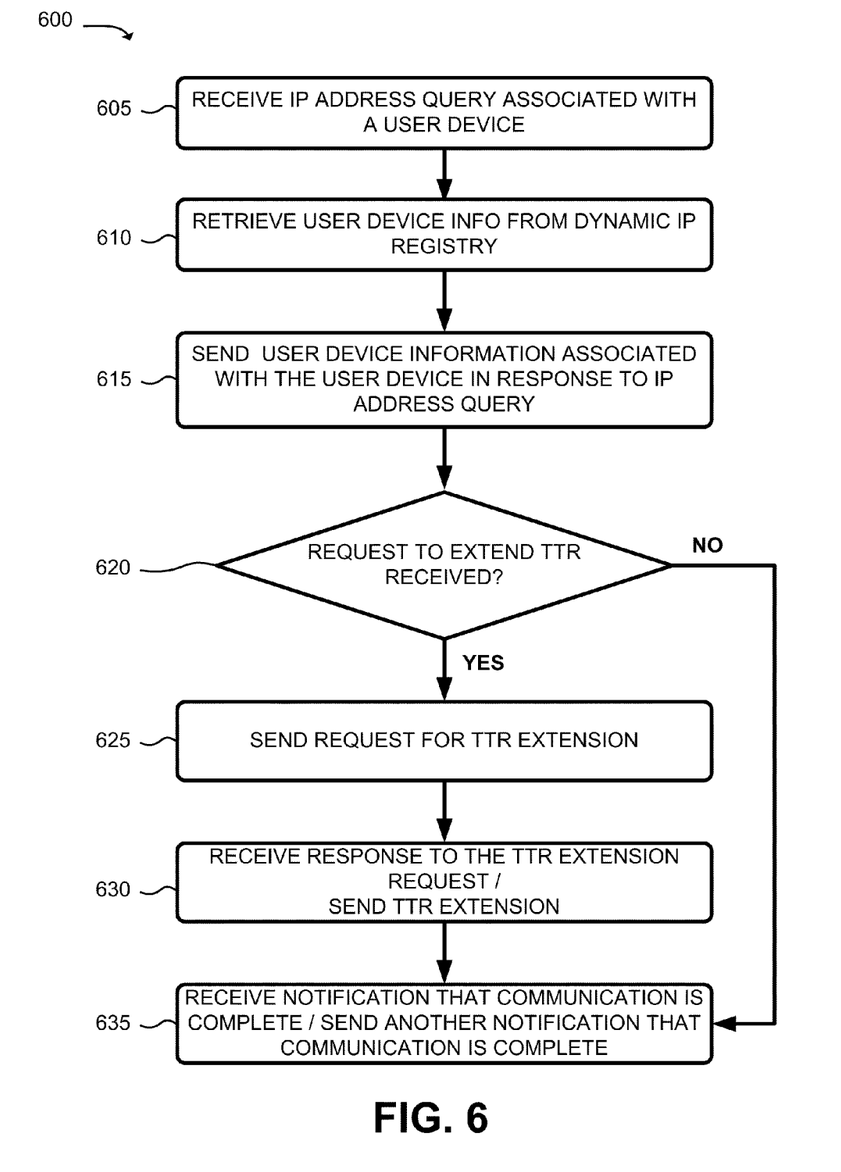
FIG. 6 is a flowchart of an exemplary process for using a dynamic IP registry within an exemplary portion of the network of FIG. 2.
Figure 7:
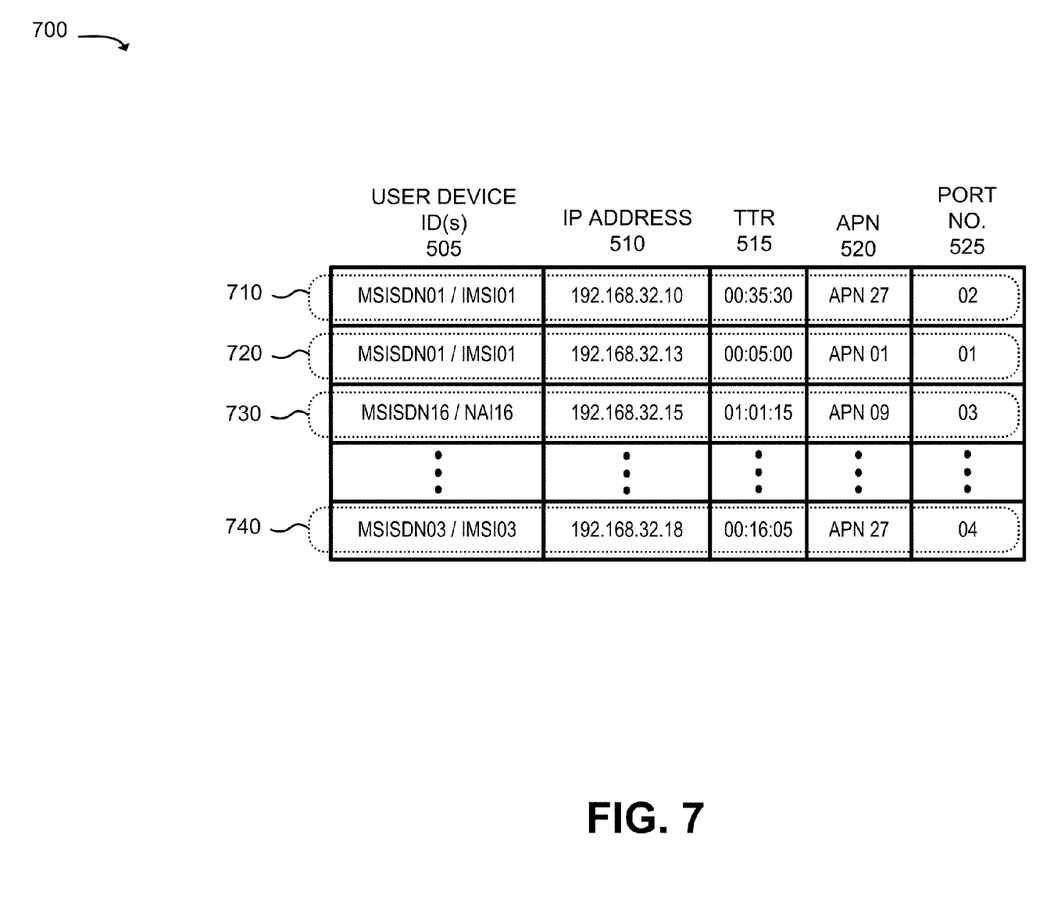
FIG. 7 is a diagram of an exemplary dynamic IP registry capable of being used in the network of FIG. 2.

FIG. 6 is a flowchart of an exemplary process 600 for using a dynamic IP registry to communicate with a user device using IP-based communication protocols within an exemplary portion of network 200 (FIG. 2). In one implementation, process 600 may be performed by IP registry server 230. In another implementation, some or all of process 600 may be performed by a device or collection of devices separate from, or in combination with, IP registry server 230. FIG. 7 is a diagram of an exemplary dynamic IP registry 700 capable of being used by network 200. A portion of process 600, of FIG. 6, will be discussed below with corresponding references to dynamic IP registry 700 shown in FIG. 7.

Process 600, of FIG. 6, may include receiving an IP address query associated with a user device (block 605). Assume that user device information, for each IP address assigned to user device 210, has been generated, stored in gateway server 220, and sent to IP registry server 230 in a manner similar to that described above (with respect to blocks 410-450 of FIG. 4). For example, application server 240 may desire to communicate with user device 210 in connection with a particular service, a particular application, a particular network, and/or particular data (e.g., voice, text, video, etc.) and may generate an IP address query to obtain IP address information associated with user device 210. Application server 240 may send the IP address query to IP registry server 230 and IP registry server 230 may receive the IP address query. The IP address query may include user device identification information, associated with user device 210, such as a public identifier (e.g., MSISDN01) and/or a private identifier (e.g., IMSI01, etc.) and/or APN information (e.g., APN 01), corresponding to a particular service, a particular network, a particular application, and/or particular data (e.g., text, voice, video, etc.), about which application server 240 desires to communicate to user device 210.

User device information may be obtained from a dynamic IP registry (block 610). For example, IP registry server 230 may obtain the user device identification information from the IP address search query received from application server 240 and may perform a look up operation using the dynamic IP registry stored in the memory of IP registry server 230. More particularly, IP registry server 230 may determine whether the user device identification information (e.g., MSISDN01, IMSI01, etc.), received from application server 240, matches user device identification information stored in the dynamic IP registry. Additionally, or alternatively, IP registry server 230 may obtain, from the dynamic IP registry (e.g., dynamic IP registry 700 of FIG. 7), the user device information associated with user device identification information that matches the user device identification information received from application server 240.

As illustrated in FIG. 7, dynamic IP registry 700 may include some or all fields (e.g., fields 505-525) as described above with respect to FIG. 5. While FIG. 7 illustrates a dynamic IP registry, that includes certain fields, such as fields 505-525, in another implementation, a dynamic IP registry may include fewer fields, additional fields, different fields or differently arranged fields than are described with respect to FIG. 7.

Dynamic IP registry 700 may include user device information associated with user device 210 and/or other user devices 210. For example, as shown by ellipse 710 of FIG. 7, user device information may include user device identification information, such as a public identifier (e.g., MSISDN01) and/or a private identifier (e.g., IMSI01); an IP address (e.g., 192.168.32.10) assigned by gateway server 220; TTR information (e.g., 00:35:30) indicating that the IP address is to expire in 35 minutes and 30 seconds (e.g., HH (hours):MM (minutes):SS (seconds)); APN information (e.g. APN 27) corresponding to a service, a network, an application, and/or data (e.g., text, voice, video, etc.); and/or port information (e.g., 02). In this example, IP registry server 230 may determine that dynamic IP registry 700 includes user device information associated with user device 210 by determining that the user device identification contained in the IP address query matches the user device identification information in the dynamic IP registry (e.g., as shown by ellipse 710). In this example, however, IP registry server 230 may determine that the APN information included in dynamic IP registry 700 (e.g., APN 27 as shown by ellipse 710) does not match the APN information contained in the IP address query (e.g., APN 01) received from application server 240.

In another example, as shown in ellipse 720, of FIG. 7, IP registry server 230 may determine, in a manner similar to that described above, that dynamic IP registry 700 includes other user device information, associated with user device 210, by determining that the user device identification information contained in the IP address query matches the user device identification information in the dynamic IP registry. Additionally, or alternatively, IP registry server 230 may determine that the APN information included in dynamic IP registry 700 (e.g., APN 01 as shown by ellipse 720) matches the APN information contained in the IP address query (e.g., APN 01) received from application server 240.

It should be understood that user device information associated with other user devices 210 may be stored in the dynamic IP registry. For example, ellipses 730 and 740, of FIG. 7, contain user device information associated with other user devices 210. In this example, as shown in ellipse 730, user device information associated with another user device 210 may include user identification information (e.g., MSISDN16/IMSI16), an assigned IP address (e.g., 192.168.32.18), TTR information (e.g., 01:01:15) indicating that the IP address is to expire in one hour, one minute, and fifteen seconds; APN information (e.g., APN 09), corresponding to a service, a network, an application, and/or data (e.g., text, voice, video, etc.), that are different than those associated with the IP address query received from application server 240; and port information (e.g., 03) associated with a port via which other user device 210 communicates with gateway server 220.

Returning to FIG. 6, user device information, associated with the user device, may be sent in response to the IP address query (block 615). For example, IP registry server 230 may obtain, from the dynamic IP registry, the user device information that includes user device identification information (e.g., MSISDN01/IMSI01), the assigned IP address (e.g., 192.168.32.13), the TTR information (e.g., 00:05:00), the APN information (e.g., APN 01), and/or the port information (e.g., 01) (as shown by ellipse 720 of FIG. 7). IP registry server 230 may send the user device information, associated with user device 210, to application server 240 in response the IP address query.

In another implementation, IP registry server 230 may determine whether the IP address, associated with user device 210, has expired or is about to expire. For example, IP registry server 230 may determine whether the TTR is less than or equal to a particular threshold (e.g., 0 seconds, 60 seconds, 5 minutes, 15 minutes, etc.). If IP registry server 230 determines that the TTR is less than or equal to the particular threshold, then IP registry server 230 may send a notification to gateway server 220 indicating that the IP address, associated with user device 210, has expired. The notification may include user device identification information, the IP address, the TTR information associated with the IP address, the APN information and/or the port information associated with user device 210. Gateway server 220 may receive the notification, may extend the TTR associated with the IP address, and may send information associated with the extended TTR to IP registry server 230. IP registry server 230 may receive the information associated with the extended TTR and may send the information associated with the extended TTR to application server 240 in a manner described above.

In another example, in response to the notification indicating that the IP address, associated with user device 210 has expired, gateway server 220 may assign another IP address to user device 210. Additionally, or alternatively, gateway server 220 may obtain a TTR associated with the other IP address and may send the other IP address and/or the TTR associated with the other IP address to IP registry server 230. IP registry server 230 may receive the other IP address and/or the TTR associated with the other IP address and may send the other IP address and/or the TTR associated with the other IP address to application server 240.

If a request to extend the TTR is received (block 620—YES), then a request for a TTR extension may be sent (block 625). For example, application server 240 may receive the response to the IP address query from IP registry server 230 and may determine whether to request a TTR extension. Application server 240 may request a TTR when the desired duration of the communication with user device 210 is greater than (or is estimated to be greater than) the period of time that the IP address is to remain valid based on the TTR. Thus, in this example, application server 240 may determine that the desired duration of communications with user device 210, associated with the particular service, the particular application, the particular network, and/or the particular data (e.g., corresponding to APN 01), is greater than the TTR (e.g., 00:05:00) associated with the IP address. Based on the determination that the desired duration of the communication with user device 210 is greater than the TTR associated with the IP address, application server 240 may send a request for a TTR extension to IP registry server 230. The request may include user device identification information, APN information, port information, and/or a desired period of time by which to extend the TTR. IP registry server 230 may receive the request for the TTR extension and may send the request for a TTR extension to gateway server 220.

In another implementation, IP registry server 230 may extend the TTR. For example, IP registry server 230 may receive the request for the TTR extension and may determine whether the desired period of time, by which to extend the TTR, is less than or equal to a particular threshold. IP registry server 230 may extend the TTR by a particular amount of time if the desired period of time by which to extend the TTR is less than or equal to the particular threshold. Additionally, or alternatively, IP registry server 230 may send a notification to a gateway server 230 indicating that the TTR associated with the IP address has been extended by the particular period of time. In another example, if IP registry server 230 determines that the desired period of time, by which to extend the TTR, is greater than the particular threshold, then IP registry server 230 may send the request to gateway server 220 in a manner similar to that described above.

A response to the TTR extension request may be received and a TTR extension may be sent (block 630). For example, gateway server 220 may receive the request for a TTR extension and may retrieve user information, associated with the user identification information, received in the extension request. In one implementation, gateway server 220 may extend the TTR associated with the IP address based the desired period of time by which to extend the TTR received in the request. In another implementation, gateway server 220 may extend the TTR by an amount set by gateway server 220. In yet another implementation, gateway server 220 may assign a new IP address and/or a corresponding TTR (that has been reset to a particular threshold), that are associated with the APN information and/or the port information that were received in the TTR extension request.

Gateway server 220 may send information associated with the extended TTR to IP registry server 230 and/or application server 240 in response to the request for TTR extension. IP registry server 230 may receive the response to the request for a TTR extension and may store the information associated with the extended TTR in the dynamic IP registry. Additionally, or alternatively, IP registry server 230 may send the response to the TTR extension request to application server 240. Application server 240 may receive the information associated with the TTR extension and may use the information associated with the TTR extension to communicate with gateway server 220. The communication may include the IP address (e.g., 192.168.32.13), extended TTR information (e.g., 30 minutes, 60 minutes, 90 minutes, etc.), user device identification information (e.g., MSISDN, IMSI, etc.), APN information (e.g., APN 01), and/or port information (e.g., 01). Gateway server 220 may receive the communication and may forward the communication to user device 210 based on the port information included in the communication.

A notification that the communication is complete may be received and another notification that the communication is complete may be sent (block 635). For example, when the communication between application server 240 and user device 210 is complete, application server 240 may send a notification to IP registry server 230 indicating that the communication is complete. IP registry server 230 may receive the notification and may send another notification to gateway server 220 indicating that the communication between application server 240 and user device 210 is complete. Gateway server 220 may receive the notification and may clear the IP address and/or the TTR corresponding to the IP address so that the IP address may be reassigned to another user device 210. In another example, gateway server 220 may permit the IP address to expire. In yet another example, gateway server 220 may reset the TTR corresponding to the IP address and may send user device information, associated with user device 210, to IP registry server 230. The user device information may include the IP address and the reset TTR.

If a request to extend the TTR is not received (block 620—NO), then a notification that the communication is complete may be received and another notification that the communication is complete may be sent (block 635). For example, application server 240 may receive, from IP registry server 230, the response to the IP address query and may communicate with user device 210 via gateway server 220 in a manner similar to that described above. More particularly, application server 240 may use the IP address to communicate with gateway server 220, gateway server 220 may receive the communication, and may forward the communication to user device 210 based on the port information included in the communication.

Additionally, or alternatively, when the communication between application server 240 and user device 210 is complete, application server 240 may send a notification to IP registry server 230 indicating that the communication is complete. IP registry server 230 may receive the notification and may send another notification to gateway server 220 indicating that the communication between application server 240 and user device 210 is complete. Gateway server 220 may receive the notification and may, in a manner similar to that described above, may reassign the IP address, may permit the IP address to expire, or may reset the TTR corresponding to the IP address.

Implementations described herein may provide a dynamic IP registry. A gateway server may identify a user device based on user device identification information and may assign an IP address to the user device. The gateway server may obtain a TTR associated with the IP address and may obtain APN information, associated with the IP address, and/or port information associated with the user device. The gateway server may send user device information, associated with the user device, to an IP registry server to be stored in a dynamic IP registry. The user device information may include the user device identification information, the IP address, the TTR information, the APN information, and/or the port information.

An application server may desire to communicate with the user device associated with particular services, particular applications, particular networks, and/or particular data, etc. and may generate an IP address query to dynamically discover the IP address associated with the user device. The application server may send the IP address query to the IP registry server. The IP address query may include user device identification information associated with the user device and/or APN information corresponding to a service, a network, an application, and/or data (e.g., text, voice, video, etc.). The IP registry server may receive the IP address query and may perform a look up operation, using the dynamic IP registry, to retrieve the IP address, the TTR, and/or the port information associated with the user device identification information and/or APN information included in the IP address query. The IP registry server may send the IP address, the TTR, the port information, and/or the APN information to the application server in response to the IP address query. In one implementation, the application server may use the IP address to communicate with the gateway server and the gateway server may forward the communication to the user device based on the port information received in the communication.

In another implementation, the application server may determine that the IP address may expire before the communication with the user device, associated with the particular service, the particular application, the particular network, the particular data, etc., is completed and may send a request for a TTR extension to the IP registry server. The IP registry server may receive the request and may forward the request to the gateway server. The gateway server may receive the request and may extend the TTR. The gateway server may send the extended TTR, in response to the request, to the IP registry server and the IP registry server may forward the request to the application server. The application server may communicate with the gateway server using the IP address and the gateway server may forward the communication to the user device based on the port information included with the communication.

The foregoing description provides illustration and description, but is not intended to be exhaustive or to limit the invention to the precise form disclosed. Modifications and variations are possible in light of the above teachings or may be acquired from practice of the invention.

While series of blocks have been described with regard to FIGS. 4 and 6, the order of the blocks may be modified in other implementations. Further, non-dependent blocks may be performed in parallel. For example, blocks of FIG. 6 may be performed in a piplelined manner with multiple instances of the pipeline operating at any given point in time. In other words, the IP registry may be performing a particular operation on an IP address query or a set of queries while performing another operation, such as a TTR extension operation, associated with another IP address query or set of queries.

It will be apparent that systems and methods, as described above, may be implemented in many different forms of software, firmware, and hardware in the implementations illustrated in the figures. The actual software code or specialized control hardware used to implement these systems and methods is not limiting of the invention. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification is taken to specify the presence of stated features, integers, steps or components but does not preclude the presence or addition of one or more other features, integers, steps, components or groups thereof.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   storing, by a server device and in a memory associated with the server device, an Internet protocol (IP) registry,
      the IP registry including a plurality of data items for a plurality of user devices,
      the plurality of data items including particular data items for a particular user device of the plurality of user devices,
      the particular data items including particular identification information for the particular user device, an IP address for the particular user device, time to release (TTR) information, a particular access point name (APN), and a port number associated with a gateway server,
      the TTR information including a particular point in time when the IP address expires, and
      the particular APN corresponding to a service, an application, a network, or data used by the particular user device;
   receiving, by the server device and from an application server, an IP address query, the IP address query including an identifier and APN information;
   determining, by the server device, that the identifier included in the IP address query matches the particular identification information included in the IP registry;
   determining, by the server device, that the APN information included in the IP address query matches the particular APN included in the IP registry;
   obtaining, by the server device and from the IP registry, the particular data items after determining that the identifier matches the particular identification information and after determining that the APN information included in the IP address query matches the particular APN included in the IP registry;
   sending, by the server device and after obtaining the particular data items, the particular data items to the application server;
   receiving, by the server device and from the application server, a request to extend the TTR,
      the request specifying a desired period of time by which the TTR is to be extended; and
      sending, by the server device and after the TTR is extended, a notification that indicates that a communication associated with the TTR is complete.

2. The method of claim 1,
   where obtaining the particular data items includes:
      determining that the TTR is less than or equal to a particular threshold;
      sending, to the gateway server, a request for another IP address, associated with the particular user device, after determining that the TTR is less than or equal to the particular threshold,
         the request including the particular identification information and the particular APN;
      receiving, from the gateway server, the other IP address and another TTR associated with the other IP address; and
      sending, to the application server and based on the IP address query, the other IP address and the other TTR.

3. The method of claim 1, further comprising
   sending, to the gateway server, another request to extend the TTR;
   receiving, from the gateway server, information associated with a TTR extension after the gateway server extends the TTR by the desired period of time; and
   sending, to the application server, the information associated with the TTR extension as a response to the request to extend the TTR.

4. The method of claim 1,
where the request to extend the TTR includes the particular identification information and the particular APN, and
where the method further comprises:
   determining whether the desired period of time is less than or equal to a particular threshold;
   extending the TTR based on another period of time when the desired period of time is less than or equal to the particular threshold;
   sending, to the gateway server and after extending the TTR based on the other period of time, a notification indicating that the TTR was extended based on the other period of time,
      the notification including the particular identification information and the particular APN; and
   sending the notification to the application server as the response to the request to extend the TTR.

5. The method of claim 4,
where, when the desired period of time is greater than the particular threshold, sending the response to the request to extend the TTR includes:
   sending another request to extend the TTR to the gateway server,
      the other request including the particular identification information, the particular APN, and the desired period of time by which the TTR is to be extended;
   receiving, from the gateway server, an extended TTR associated with the IP address; and
   sending the extended TTR, the particular identification information, and the particular APN to the application server as the response to the request to extend the TTR.

6. The method of claim 1, further comprising:
receiving, from the application server and before sending the notification, another notification indicating that the communication is complete,
   the communication being between the application server and the particular user device, and
   the other notification including the particular identification information and the particular APN.

7. The method of claim 1,
where the particular identification information includes a public identifier or a private identifier,
where the public identifier is a mobile subscriber integrated services digital network number, and
where the private identifier is an international mobile subscriber identity.

8. A server comprising:
a memory to store instructions and an Internet protocol (IP) registry,
   the IP registry including data for a plurality of user devices,
   the data including particular data for a particular user device of the plurality of user devices,
   the particular data including particular identification information for the particular user device, an IP address for the particular user device, a time-to-release (TTR) corresponding to the IP address, a particular access point name (APN), and a port number associated with a gateway server, and
   the particular APN corresponding to a service, an application, a network, or data associated with the particular user device; and
a processor to execute the instructions to:
   receive, from an application server, an IP address query that includes an identifier and APN information,
   determine that the identifier included in the IP address query matches the particular identification information included in the IP registry,
   determine that the APN information included in the IP address query matches the particular APN included in the IP registry,
   identify the particular data after determining that the identifier included in the IP address query matches the particular identification information included in the IP registry and after determining that the APN information included the IP address query matches the particular APN included in the IP registry,
   send, to the application server, the particular data,
   receive, from the application server, a request to extend the TTR,
      the request specifying a desired period of time by which the TTR is to be extended; and
   send, after the TTR is extended, a notification that indicates that a communication associated with the TTR is complete.

9. The server of claim 8, where the processor is further to:
send, to the gateway server, a different request to extend the TTR,
   the different request including the particular identification information and the particular APN, and
receive, from the gateway server, information associated with a TTR extension after the gateway server extends the TTR.

10. The server of claim 8, where the processor is further to:
determine whether the TTR is less than or equal to a particular threshold,
send, to the gateway server, a request for another IP address, associated with the particular user device, when the TTR is less than or equal to the particular threshold,
   the request including the particular identification information and the particular APN,
receive, from the gateway server, information associated with a TTR extension after the gateway server extends the TTR, and
send, to the application server, the TTR extension.

11. The server of claim 8, where the processor is further to:
extend the TTR, and
send, to the gateway server, another notification indicating that the TTR was extended,
   the other notification including the particular identification information and the particular APN.

12. The server of claim 8, where, when sending the particular data, the processor is to:
determine that the TTR is greater than a particular threshold, and
send, to the application server, the particular data after determining that the TTR is greater than the particular threshold.

13. The server of claim 8, where, when sending the particular data, the processor is to:
determine that the TTR is greater than a particular threshold,
determine that the IP address has not expired after determining that the TTR is greater than the particular threshold, and
send, to the application server, the particular data after determining that the IP address has not expired.

14. The server of claim 8, where the processor is further to:
send, to the gateway server, a different request to extend the TTR,
   the different request including the particular identification information and the particular APN, receive, from the gateway server, information associated with a TTR extension after the gateway server extends the TTR, and send, to the application server, the information associated with the TTR extension as the response to the request to extend the TTR.

15. The server of claim 8, where, the processor is further to:

determine whether the desired period of time is less than or equal to a particular threshold, extend the TTR by another period of time when the desired period of time is less than the particular threshold, send, to the gateway server, a notification indicating that the TTR was extended by the other period of time, the notification including the particular identification information and the particular APN, and send the notification to the application server as a response to the request to extend the TTR.

16. The server of claim 8, where the processor is further to:

determine whether the desired period of time is less than or equal to a particular threshold, send, to the gateway server, another request to extend the TTR when the desired period of time is greater than the particular threshold, the other request including the particular identification information, the particular APN, and the desired period of time by which the TTR is to be extended, receive, from the gateway server, information associated with a TTR extension after the gateway server extends the TTR, and send, to the application server, the information associated with the TTR extension as a response to the request to extend the TTR.

17. A non-transitory computer-readable medium storing instructions, the instructions comprising:

one or more instructions that, when executed by a first server device, cause the first server device to:

store, in a memory associated with the first server device, an Internet protocol (IP) registry, the IP registry including a plurality of data items for a plurality of user devices, the plurality of data items including particular data items for a particular user device of the plurality of user devices, the particular data items including particular identification information for the particular user device, an IP address for the particular user device, time-to-release (TTR) corresponding to the IP address, a particular access point name (APN), and port information regarding a gateway server, and the particular APN corresponding to a service, an application, a network, or data associated with the particular user device;

receive, from a second server device, an IP address query that includes an identifier and APN information;

determine that the identifier included in the IP address query matches the particular identification information included in the IP registry;

determine that the APN information included in the IP address query matches the particular APN included in the IP registry;

identify, using the IP registry, the particular data items after determining that the identifier included in the IP address query matches the particular identification information included in the IP registry and after determining that the APN information included in the IP address query matches the particular APN included in the IP registry, send, to the second server device, the particular data items, the IP address and the port information being used by the second server device to communicate with the particular user device via the gateway server, receive, from the second server device, a request to extend the TTR corresponding to the IP address, the request to extend the TTR specifying a desired period of time by which the TTR is to be extended, obtain an extended TTR corresponding to the IP address based on the request to extend the TTR, and send, after obtaining the extended TTR, a notification that indicates that a communication associated with the TTR is complete.

18. The non-transitory computer-readable medium of claim 17, where the one or more instructions to obtain the extended TTR comprise:

one or more instructions that, when executed by the first server device, cause the first server device to:

determine whether the desired period of time is greater than a particular threshold, send, to the gateway server, another request to extend the TTR, as an extended TTR, when the desired period of time is greater than the particular threshold, the other request including information identifying the desired period of time, the particular identification information, and the particular APN, and receive, from the gateway server, the extended TTR.

19. The system non-transitory computer-readable medium of claim 17, where the one or more instructions to identify the particular data items comprise:

one or more instructions that, when executed by the first server device, cause the first server device to:

obtain the TTR and the IP address from the particular data items, determine that the TTR is greater than a particular threshold, and determine that the IP address has not expired after determining that the TTR is greater than the particular threshold.

20. The non-transitory computer-readable medium of claim 17, where the one or more instructions to identify the particular data items comprise:

one or more instructions that, when executed by the first server device, cause the first server device to:

obtain the TTR and the IP address from the particular data items, determine that the TTR is less than or equal to a particular threshold, determine that the IP address has expired after determining that the TTR is less than or equal to the particular threshold, extend the TTR by the desired period of time to create another extended TTR after determining that the IP address has expired, and send the other extended TTR to the second server device.

21. The non-transitory computer-readable medium of claim 17, where the one or more instructions to identify the particular data items comprise:

one or more instructions that, when executed by the first server device, cause the first server device to:

obtain the TTR and the IP address from the particular data items, determine that the TTR is less than or equal to a particular threshold, determine that the IP address has expired after determining that the TTR is less than or equal to the particular threshold, send, to the gateway server, another request for another IP address associated with the particular user device,
the other request including the particular identification information and the particular APN, receive, from the gateway server, the other IP address and another TTR associated with the other IP address, and send, to the second server device, the other IP address and the other TTR.

22. The non-transitory computer-readable medium of claim 17, where the one or more instructions to identify the particular data items comprise:

one or more instructions that, when executed by the first server device, cause the first server device to:

obtain the TTR and the IP address from the particular data items, determine that the TTR is less than or equal to a particular threshold, determine that the IP address has expired after determining that the TTR is less than or equal to the particular threshold, send, to the gateway server, another request to extend the TTR after determining that the IP address has expired,
the other request including the particular identification information and the particular APN, receive, from the gateway server, another extended TTR associated with the IP address, and send, to the second server device, the other extended TTR.

23. The non-transitory computer-readable medium of claim 17, where the instructions further comprise:

one or more instructions that, when executed by the first server device, cause the first server device to:

receive, from the second server device and before sending the notification, another notification indicating that the communication is complete,
the communication being with the particular user device, and
the other notification including the particular identification information and the particular APN.

24. The non-transitory computer-readable medium of claim 17, where the instructions further comprise:

one or more instructions that, when executed by the first server device, cause the first server device to:

receive, from the gateway server, the particular data items for the particular user device, and store the particular data items in the IP registry.

25. The non-transitory computer-readable medium of claim 17, where the instructions further comprise:

one or more instructions that, when executed by the first server device is further, cause the first server device to:

receive, from the gateway server, the particular data items for the particular user device,
the particular data items further including:
one or more other IP addresses for the particular user device,
one or more other TTRs corresponding to the one or more other IP addresses,
one or more other APNs corresponding to the one or more other IP addresses, and
one or more port numbers associated with the gateway server,
a particular port number, of the one or more port numbers,
corresponding to one of the one or more other IP addresses, and store the particular data items in the IP registry.

* * * * *